United States Patent [19]
Topol

[11] 3,787,703
[45] Jan. 22, 1974

[54] OPTICAL SENSING SAMPLING HEAD

[75] Inventor: George J. Topol, Silver Spring, Md.

[73] Assignee: Biospherics Incorporated, Rockville, Md.

[22] Filed: May 25, 1972

[21] Appl. No.: 256,821

[52] U.S. Cl. ............... 250/574, 250/231, 250/571, 356/130
[51] Int. Cl. ............................................. G01n 21/26
[58] Field of Search ............................ 250/218, 231

[56] References Cited
UNITED STATES PATENTS

| | | | |
|---|---|---|---|
| 2,866,379 | 12/1958 | Veit | 250/218 |
| 3,358,148 | 12/1967 | Conklin | 250/218 |
| 3,510,666 | 5/1970 | Topol | 250/218 |
| 3,573,470 | 4/1971 | Haley | 250/218 |
| 3,450,886 | 6/1969 | Lown | 250/218 |

*Primary Examiner*—Harold A. Dixon
*Attorney, Agent, or Firm*—D. C. Roylance et al.

[57] ABSTRACT

An optical sensing head which can be used with a probe and immersed in fluids and which operates to detect direct and refracted light transmission characteristics of the fluid and provide electrical signals representative thereof for further analysis. The apparatus includes a glass tube surrounded by an opaque cylindrical body having compartments to hold a light source and two photocells. The source and photocells lie in the same plane which is transverse with respect to the tube axis. An occluding pin is non-centrally disposed within the tube and is spaced from the interior walls of the tube. The body which holds the photocells and light source has openings which permit light from the source to illuminate the interior of the tube and which permits the photocells to sense light coming from within the tube, substantially all ambient light being excluded by the opaque body. The angular relationship of the openings to the photocells and source is critical, the path between one photocell and the light source being in a direct line with the occluding pin so that no light can pass directly from the source to that photocell. The other photocell, however, is disposed so that there is a direct linear light path between the source and that photocell. Thus, one cell receives direct light transmission and the other cell receives light only as a result of reflection and refraction by a fluid placed in the space in the plane containing the photocells. The apparatus includes a piston which surrounds the occluding pin within the tube and which is mounted for reciprocating movement therein to alternately block and unblock the light paths, draw fluid samples into the tube and then expel the samples, and to wipe the interior of the tube and the exterior of the occluding pin clean with sealing rings carried by the piston on each reciprocating motion. In a preferred embodiment the head is mounted on an elongated cylindrical housing so that it can be immersed to any desired depth in a body of fluid and can be cyclically driven to monitor the light transmission characteristics of the fluid while immersed.

9 Claims, 7 Drawing Figures

PATENTED JAN 22 1974 3,787,703

OPTICAL SENSING SAMPLING HEAD

This invention relates to an apparatus for measuring the light transmissive characteristics of a body of fluid.

In various situations involving fluids having optical transmission characteristics which must be periodically measured or continuously monitored, or in circumstances in which the level of dispersed particulate solid material in the fluid must be either measured periodically or continuously monitored, it is necessary to use some kind of optical device having a light source and photo sensing means in which the various properties of the fluid and its contents can be analyzed. In most circumstances, the fluid is analyzed by extracting a sample of the fluid from the tank, pipe or other container in which the fluid exists and placing the sample in a measuring device wherein it is subjected to the necessary tests. In order to reduce the level of individual attention required to make such tests, various automatic devices have been proposed by which fluid samples can be taken and analyzed.

One type of device of this kind requires mounting in a pipe or tank wall whereby it can extract samples from the larger reservoir of fluid, analyze the samples for the necessary characteristics, and return the sample to the reservoir. In principle, this is a fully satisfactory system, but requires either installation when the system is installed or rather inconvenient or expensive installation at some later date. Other systems have been used wherein tubes, pumps or the like are employed to extract fluid samples from the reservoir and then return them to the reservoir after the necessary tests have been made. Such systems have the severe disadvantage that large particles may not pass through the conduits or might be altered by the transportation system itself.

Accordingly, it is an object of the present invention to provide a fluid monitoring apparatus which can be installed temporarily by immersion in a body of the fluid to be tested, or can be installed permanently in a very inexpensive fashion.

It is a further object to provide an apparatus which measures direct transmission of light, the level of light scattered by suspended particles and the like, and provides information on the two forms of transmission for analysis.

Yet another object is to provide an apparatus in which direct and scattered transmitted light is detected and correlated on a cyclic sampling basis.

Briefly described, the invention includes a tubular chamber shielded from ambient light and containing a light source for illuminating the interior of the chamber. A light sensing device is mounted in a wall of the chamber to receive light directly transmitted from the source. A second photo detecting device is mounted in an angularly spaced location relative to the first device and an occluding member is disposed between the source and the second device so that the shadow of the occluding member shields the second device from any direct transmission of light. Thus, the second device receives only light which has been reflected or scattered by material in the chamber. The invention also contemplates the incorporation of means to produce a sample fluid into the chamber, such means including a reciprocating piston which alternately draws in and ejects fluid samples. The piston can be provided with means for cyclically wiping the interior of the chamber and the occluding device to prevent the accumulation of residue which might affect subsequent operations.

In order that the manner in which the foregoing and other objects are attained in accordance with the invention can be understood in detail, a particularly advantageous embodiment thereof will be described with reference to the accompanying drawings, which form a part of this specification, and wherein.

Figure 1:
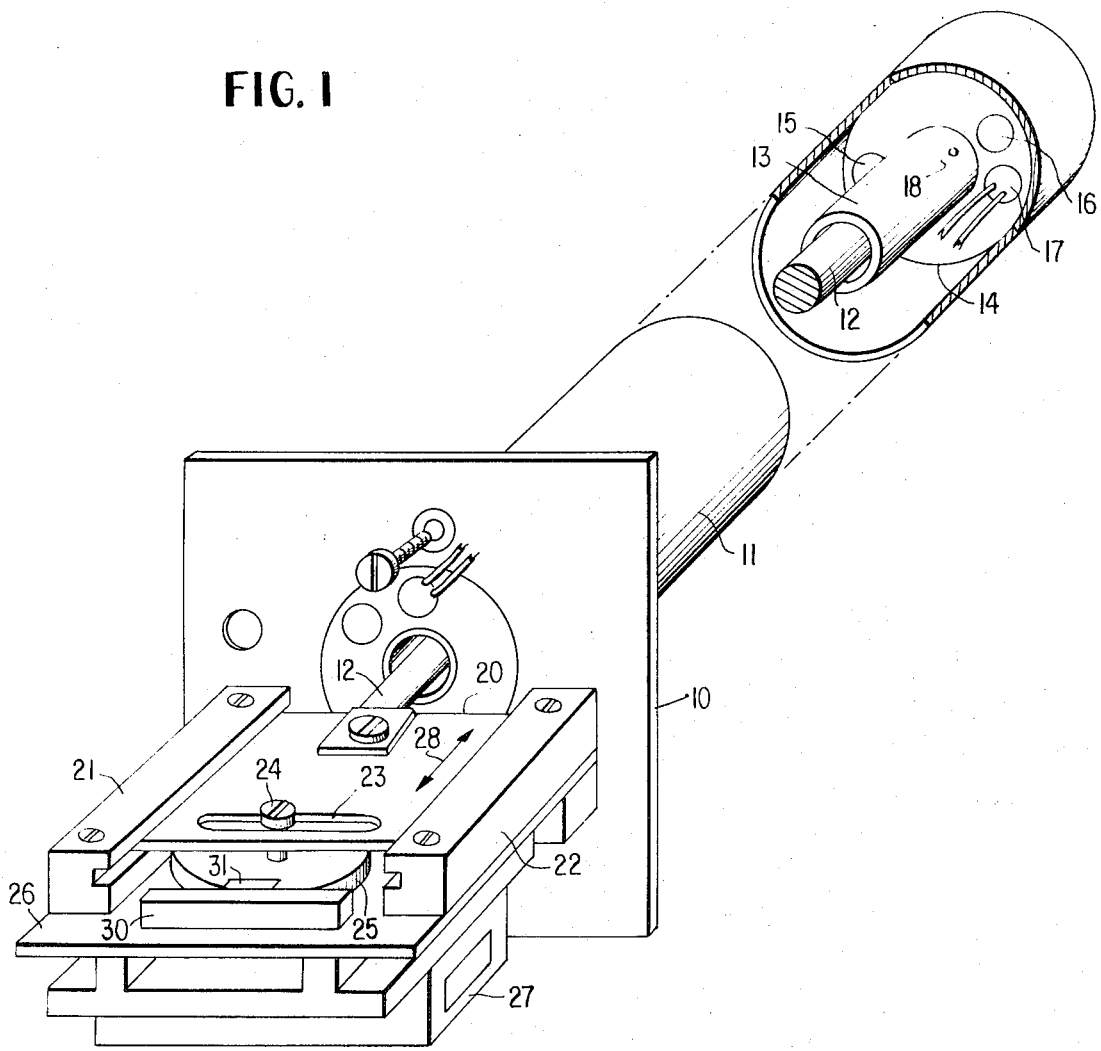
FIG. 1 is a perspective view, in partial section of a probe incorporating the invention.

In FIG. 1 is shown an assembled probe including a mounting plate 10 to which is attached an elongated cylindrical tube 11 which supports and contains the majority of the apparatus to be hereinafter described. The probe can be made in any convenient length, depending upon the application to which it is put, and depending upon the strength of the materials used. A typical probe includes a tube approximately 120 centimeters long.

A drive rod 12 extends longitudinally through the center of tube 11 and passes through a cylindrical sleeve 13 which is attached to, or forms a part of, a cylindrical body 14 at the end of tube 11. Body 14 is provided with a central opening, to be shown and described hereinafter, and three non-centrally disposed axial blind bores 15, 16 and 17. As will be described hereinafter, the opening identified as 15 contains a light source and openings 16 and 17 contain light responsive devices.

Sleeve 13 also has an opening for a pin 18 which extends approximately diametrically through the sleeve to support a pin to be described hereinafter.

At the other end of drive shaft 12, the shaft is connected to a slide plate 20 in any convenient fashion. Plate 20 is supported for reciprocating linear movement in guide members 21 and 22, each guide member being an inwardly facing U-shaped body. Near one edge of plate 20 is provided an elongated transverse slot 23 through which a crank pin 24 extends. Pin 24 is excentrically journaled in a crank wheel 25 which is connected to a shaft, not shown, and journaled for rotary motion in a mounting plate 26. The shaft to which wheel 25 is connected is coupled to a motor 27 of any convenient type.

As will be seen, rotation of motor 27 causes rotation of crank wheel 25, thereby causing crank pin 24 to repetitively describe a circle. As pin 24 moves in slot 23, plate 20 is caused to reciprocate in the directions shown by arrows 28, thereby driving shaft 12 in a linear reciprocatory manner.

A magnetic switch 30 can also be mounted on plate 26 adjacent crank wheel 25, and a permanent magnet 31 can be embedded in the periphery of wheel 25 so that a periodic indication of the complete rotation of wheel 25 can be obtained externally of the apparatus.

Figure 2:
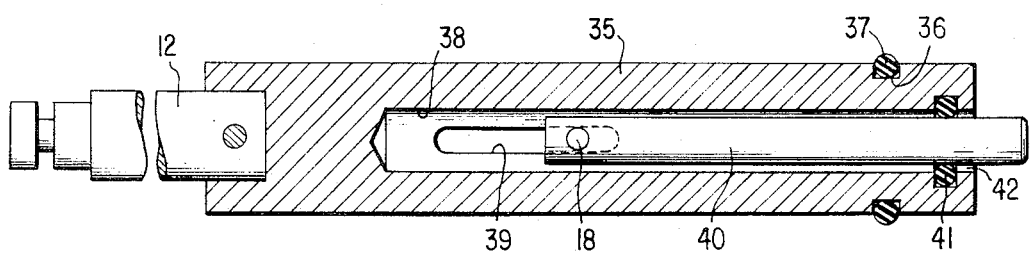
FIG. 2 is a longitudinal section of the occluding pin and piston portion of the apparatus of FIG. 1.

FIG. 2 shows, in greater detail, the construction of drive shaft 12 and its connection to a piston 35 to which the shaft is connected within sleeve 13. Piston 35 is an elongated cylindrical member having an anular groove 36 in the exterior surface thereof to receive a sealing ring 37. An axial bore 38 extends inwardly from the distal end of the piston, the bore being offset from the central axis of the piston. An elongated slot 39 extends in a direction parallel with the axis of the cylinder on opposite sides thereof, the slot opening into the bore 38 and in the other surface of the cylinder. A pin 40 resides within bore 38 and is located by pin 18 which extends through pin 40, through slots 39, and is snugly fitted in sleeve 13 as previously mentioned in describing FIG. 1. Near the open end of the bore, a second anular groove is provided to receive a sealing ring 42 which centrally locates pin 40 and acts to wipe the exterior of the pin clean each time there is an axial relative reciprocation.

From FIGS. 1 and 2, it will be recognized that pin 40 is stationary relative to sleeve 13 and the remainder of the apparatus, while piston 35 is reciprocated by the drive mechanism previously described.

Figure 3:
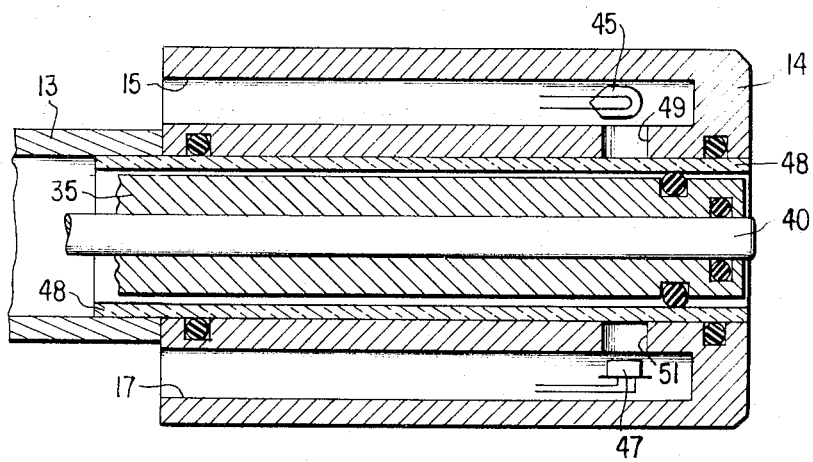
FIGS. 3 and 4 are partial sections of the probe end of the apparatus of FIG. 1 showing the piston in its two extreme operative positions.
Figure 4:
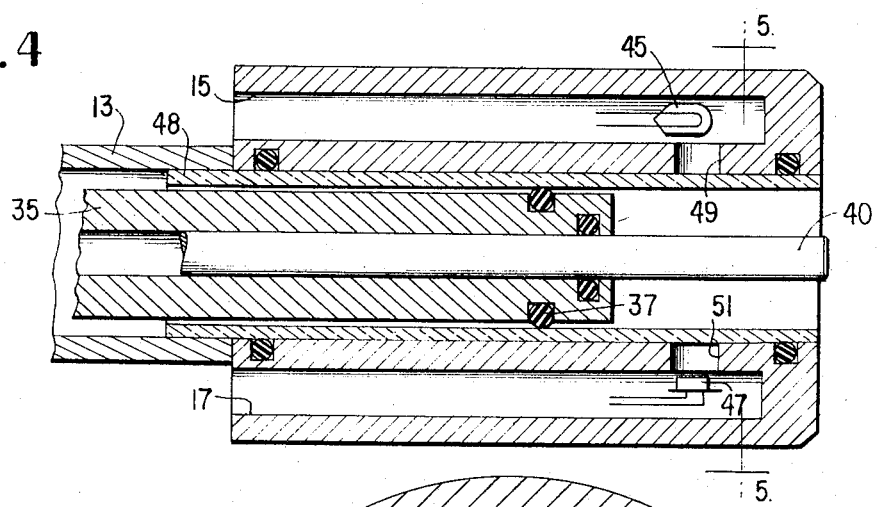
Figure 5:
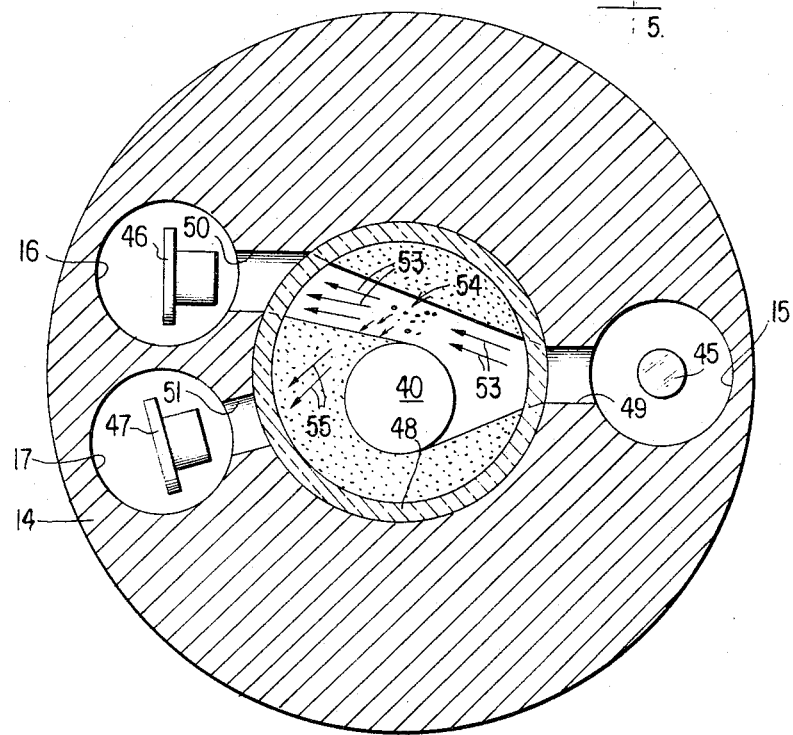
FIG. 5 is a transverse section of the probe along lines 5—5 of FIG. 4, somewhat enlarged.

The apparatus in the distal end of the probe assembly is more clearly shown in FIGS. 3–5, this apparatus including tubular body 14 which is provided with axially extending openings 15, 16 and 17 to receive the light source 45 and photocells 46 and 47, respectively.

A glass tube 48 lines the interior cylindrical bore within body 14 and surrounds piston 35. It will be observed that sealing ring 37 wipes the interior surface of the glass tube in the vicinity of the light source and photocells upon each reciprocatory motion.

The body 14 is provided with light communicating wall portions adjacent each of the light transmitting and receiving elements, an opening 49 being provided adjacent light source 45 and openings 50 and 51 being provided adjacent photocells 46 and 47, respectively. These openings, together with transparent walls of the glass tube, provide light transmitting wall portions so that light emanating from source 45 can enter the interior of the chamber formed by tube 48 and piston 35 when the piston is in a retracted position.

As seen in FIGS. 3 and 4, the piston is movable between a sample ejecting position, as shown in FIG. 3, and a sample collecting position as shown in FIG. 4. The distal end of tube 48 is open to the environment, such as a tank of the fluid to be tested. Upon withdrawal of the piston to the left, as shown in FIG. 4, a partial vacuum is created by the seal provided by ring 37, causing a sample of the fluid to be drawn into the end region of tube 48. The openings 49, 50 and 51 all lie in the same transverse plane with respect to the axis of the probe, this plane also being in the region to which the sample is drawn. Thus, the light transmission from source 45 to the photocells can be determined.

To understand the specific nature of the light paths involved, reference is made to FIG. 5 in which the end of the structure is enlarged and the interior of the chamber formed by withdrawal of piston 35 is shown with dotted shading to illustrate those portions which are normally in shadow. As indicated by arrow 53, light is transmitted directly from source 45 to photocell 46 and, if the fluid contained in the chamber is perfectly clear, photocell 47 would be completely in the shadow of occluding pin 40 and would receive no light whatever.

However, if the fluid drawn into the chamber contains suspended particulate material such as that indicated generally at 54, scattered or reflected light is directed toward photocell 47 as indicated by arrows 55. Thus, the light level received at photocell 47 is a measure of the level of particulate material contained in the fluid sample, and the relative levels of light received by photocells 46 and 47 indicate clearly such density with inherent correction for changing characteristics of the light source and the transparency of tube 48.

Figure 6:
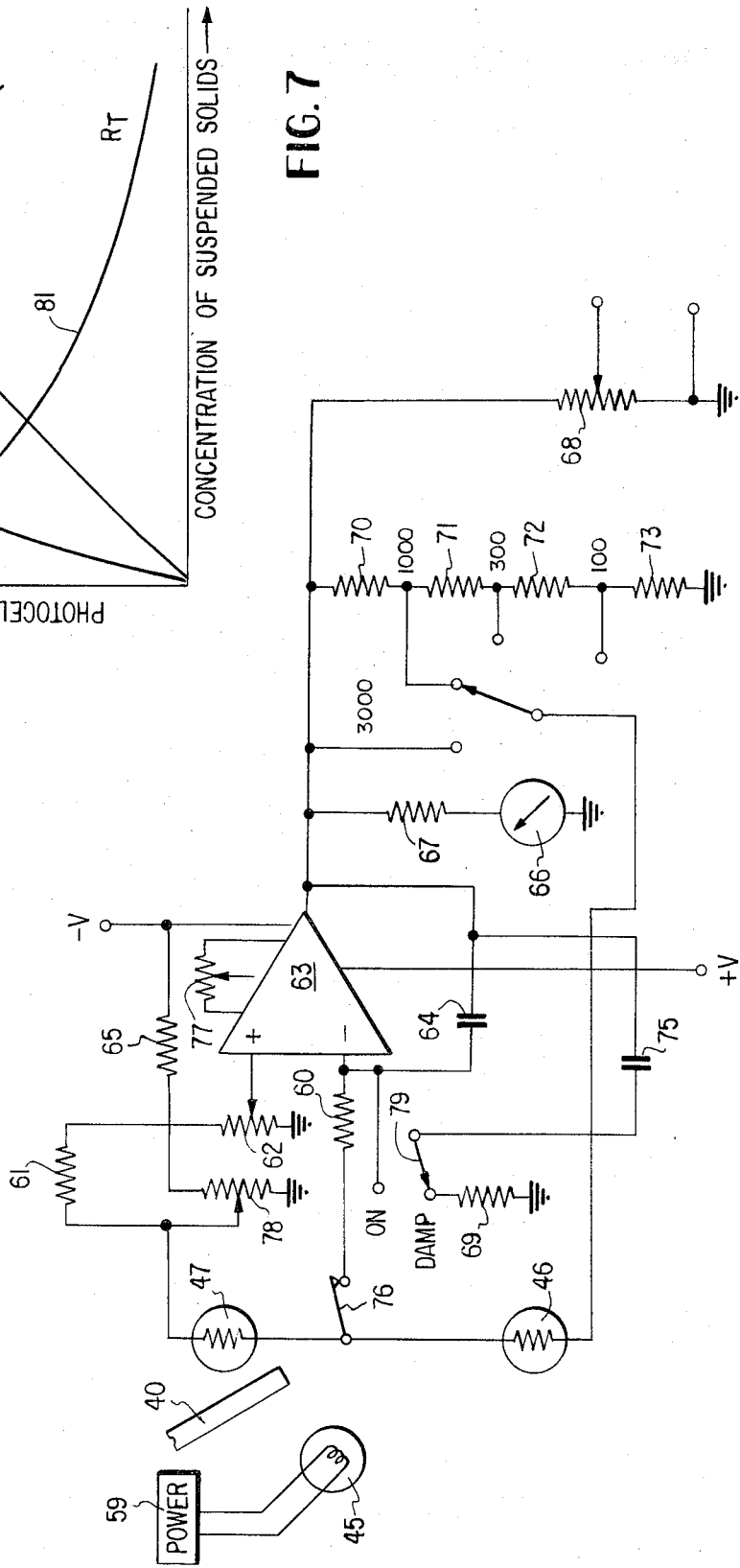
FIG. 6 is a schematic diagram of a circuit with which the light source and photocells of the apparatus of FIGS. 1-5 can be employed.

Referring now to FIG. 6, it will be seen that a relatively simple circuit can be employed to accept the signals resulting from the varying photocell outputs to produce a usable record or indication. As shown, a power source 59, which is typically a 5-volt source, is connected to a lamp 45 which is the source of light previously discussed. The photocell which directly receives light from the lamp 45 is cell 46 which has a resistance which will be referred to as $R_T$. Photocell 47 receives light resulting from scattering due to suspended particles, direct light being blocked by pin 40 which is schematically indicated in FIG. 6. Cell 47 has a resistance which can be referred to as $R_S$.

The two photocells are connected in series circuit relationship with one end of cell 47 being connected to the non-inverting input of a differential amplifier 63 by means of a resistive network which functions as both a standardizing and zeroing network. Resistor 65 and potentiometer 78 act as voltage dividers which allow the meter reading to be adjusted during instrument calibration to the proper levels required when sampling distilled water and a Formazin Standard. The junction of the two cells is connected to the inverting input of the differential amplifier through a reed switch 76 and resistor 60. Switch 76 allows sampling to take place only during the sampling mode when piston 40 is in the withdrawn position. A capacitor 64 is connected between the output and inverting input of amplifier 63 to hold the last voltage applied so there will be no fluctuation of reading between samplings. The remainder of the feedback loop consists of $R_T$ in series with the proper divider resistance as selected by switch 74 which acts as a range selector. Resistors 70, 71, 72 and 73 act as a signal divider by which the corresponding range values of 100, 300, 1000, 3000 ppm may be selected. When the power switch 79 is placed in Damp (damping) position an additional 10μf capacitor is placed across the amplifier. This capacitor slows down the response of the electronic circuit during the sampling interval, thus averaging the output signal. This prevents any abnormal sample from over influencing the readings.

The amplifier output is connected to an indicating meter 66 through a resistor 67, and the output is also connected to a potentiometer 68 which can be coupled to an additional utilization device such as a strip chart recorder indicated schematically at 69.

As will be seen, the signal appearing at the junction of photocells 46 and 47 is delivered to the negative input of the operational amplifier. The feedback from the amplifier output back to the input through the feedback resistor tends to keep the input junction at virtual ground, or zero volts. This produces a voltage at the amplifier output which is proportional to the input and dependent upon the setting of the range switch 74.

Figure 7:
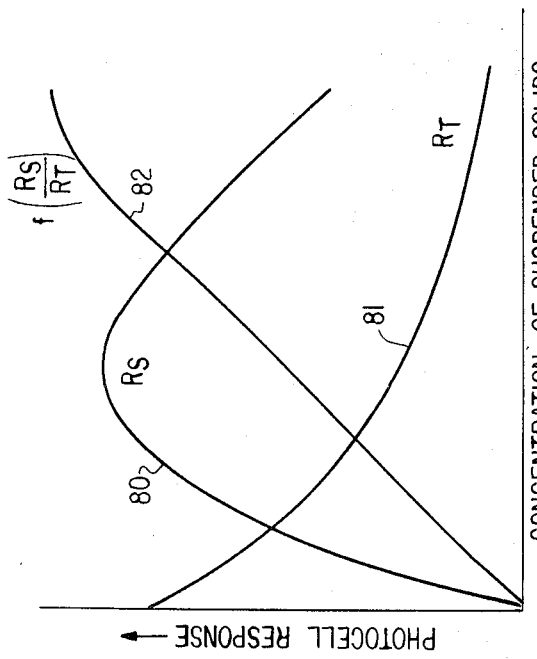
FIG. 7 is a graph of typical direct and scattered light response characteristics of such an apparatus.

The response of the photocells and a typical output of a circuit such as FIG. 6 is shown in FIG. 7, the curve identified as 80 being a typical response characteristic of the cell exposed only to scattered light with an increase in the concentration of the suspended solids in the sample fluid. Curve 81 represents the response of cell 46 which is exposed to direct light, and curve 82 represents a function of the ratio of the signals produced by cells 47 and 46, this function being the output signal of the circuit of FIG. 6. It will be observed that this is essentially linear over a significant range of concentration, this being the most used range thereof. It will also be observed that neither cell, alone, is sufficiently linear or sufficiently sensitive to give the kind of information which can be obtained through proper conjunction of the two response characteristics.

While one advantageous embodiment has been chosen to illustrate the invention it will be understood by those skilled in the art that various changes and modifications can be made therein without departing from the scope of the invention as defined in the appended claims.

What is claimed is:

1. An apparatus for measuring the light transmission characteristics of a fluid comprising the combination of
   a glass tube having at least one open end;
   a generally tubular opaque body surrounding the tubular surface of said tube, said body having
      openings to receive a light source and two photocells, and
      transparent wall portions adjacent said openings to conduct light between said openings and the glass tube,
      said transparent wall portions being in the same plane, which plane extends generally transversely of the axis of said tube;
   an elongated opaque member fixedly mounted and extending longitudinally within said tube, said elongated member being spaced from the inner walls of said tube in the vicinity of the plane containing said wall portions, and being positioned to block the light path between the wall portions adjacent the light source and one photocell but allow an essentially unobstructed light path to exist between the wall portions adjacent the light source and the other photocell; and
   a piston movable longitudinally of said glass tube into and out of said plane containing said transparent wall portions to draw samples of fluid through said open end of said glass tube and into and out of said plane containing said transparent wall portions.

2. An apparatus according to claim 1 wherein
   said piston surrounds said elongated opaque member, and is provided with internal and external sealing members which contact the exterior surface of said opaque member and the interior surface of said tube for the dual purposes of drawing fluid into the tube and wiping said surfaces clean in the vicinity of said plane.

3. An immersible probe for measuring the transmission and refraction properties of fluids comprising
   a tubular body having at least one open end;
   an opaque pin fixedly mounted in said tubular body, said pin having an axis parallel with the axis of said tubular body;
   a piston disposed within said tubular body, and surrounding said pin, said piston being longitudinally movable relative to said tubular body and said pin to draw fluid into said tubular body from said one open end;
   a first light transmissive wall portion in said tubular body;
   a source of light mounted adjacent said first wall portion radially outwardly of said tubular body;
   a second light transmissive wall portion located approximately diametrically opposed to said first wall portion;
   a first photocell disposed adjacent said second wall portion and radially outwardly of said tubular body in a position to receive direct light transmission from said source;
   a third light transmissive wall portion disposed on a line through said light source and perpendicular to said pin; and
   a second photocell disposed adjacent said third wall portion and radially outwardly of said tubular body, said third portion and said pin being dimensioned and disposed to prevent direct light transmission from said source to said second photocell,
   said photocells being shielded by said tubular body to limit the light received by said first photocell to light from said source, and to limit the light received by said second photocell to light refracted by fluid drawn into said tubular body.

4. A probe according to claim 3 and further comprising
   drive means for cyclically reciprocating said piston between a location in which light passage from said source to said photocells is blocked by the piston and a location in which light passage is not blocked thereby.

5. An immersible probe for measuring the transmission and refraction properties of fluids comprising
   a cylinder having a longitudinal cylindrical bore extending inwardly from one end of the cylinder;
   an opaque pin mounted in said bore, said pin having an axis parallel with the axis of said cylinder;
   a piston disposed within said bore and surrounding said pin, said piston being longitudinally movable relative to said cylinder and said pin to draw fluid into said bore;
   a first light transmissive wall portion in said cylinder;
   a source of light mounted adjacent said first wall portion radially outwardly of said bore;
   a second light transmissive wall portion located approximately opposite said first wall portion;
   a first photocell disposed adjacent said second wall portion and radially outwardly of said bore in a position to receive direct light transmission from said source;
   a third light transmissive wall portion disposed on a line through said light source and said pin;
   a second photocell disposed adjacent said third wall portion and radially outwardly of said bore, said third portion and said pin being dimensioned and disposed to prevent direct light transmission from said source to said second photocell,
   said photocells being shielded to limit the light received by said first photocell to light from said source, and to limit the light received by said second photocell to light refracted by fluid drawn into said bore; and
   drive means for cyclically reciprocating said piston between a location in which light passage from said source to said photocells is blocked by the piston and a location in which light passage is not blocked thereby, and wherein said piston carries means for wiping the exterior of said pin and the inner surfaces of said transmissive wall portions during each reciprocation.

6. An apparatus for measuring the light transmission characteristics of a fluid comprising the combination of a glass tube open at at least one end;

a generally tubular opaque body surrounding said tube, said body having openings to receive a light source and two photocells, and transparent wall portions adjacent said openings to conduct light between said openings and the glass tube, said wall portions being in the same plane, which plane extends generally transversely of the axis of said tube;

an elongated opaque member fixedly mounted longitudinally in said tube in a position offset from the longitudinal axis of said tube, said elongated opaque member being spaced from the inner walls of said tube in the vicinity of said openings, and said elongated opaque member being positioned to block the light path between the wall portions adjacent the light source and one photocell but allow an essentially unobstructed light path to exist between the wall portions adjacent the light source and the other photocell; and means for causing samples of fluid to move into and out of the portion of said tube adjacent said transparent wall portions.

7. An apparatus for measuring the light transmission characteristics of a fluid comprising the combination of a glass tube having at least one open end;

a generally tubular opaque body surrounding said tube, said opaque body having openings to receive a light source and two photocells, and transparent wall portions adjacent said openings to conduct light between each of said openings and said glass tube, all of said transparent wall portions being in the same plane which extends generally transversely of the axis of said glass tube;

an elongated opaque member fixedly mounted longitudinally in said glass tube in a position offset from the longitudinal axis of said tube, said elongated opaque member being spaced from the inner walls of said glass tube in the vicinity of said openings, and being positioned to block the light path between the transparent wall portions adjacent said light source and one photocell, but allow an essentially unobstructed light path to exist between the wall portions adjacent the light source and the other photocell; and a piston located in said tube and movable longitudinally thereof into and out of the plane containing said transparent wall portions for drawing samples of fluid through said open end of said glass tube and into and out of the plane containing said transparent wall portions.

8. An apparatus according to claim 7 wherein said piston surrounds said opaque member and is provided with internal and external sealing members which contact the exterior surface of said opaque member and the interior surface of said tube for wiping said surfaces clean in the vicinity of said plane.

9. An apparatus for measuring the light transmission characteristics of a fluid comprising the combination of an opaque member having a cylindrical bore extending inwardly from one end of said member;

a transparent tube mounted in said bore, said tube having an outer diameter equal to the inner diameter of said bore and an open and adjacent the end of said bore;

a light source mounted in said opaque member;

means defining a passageway in said opaque member for permitting light from said light source to pass through the wall of said transparent tube and into said tube;

two photocells mounted in said opaque member on an opposite side of the longitudinal axis of said tube from said light source, said photocells being angularly spaced from each other, and said photocells and said light source being contained in a plane generally transverse to the longitudinal axis of said tube;

means defining two additional passageways in said opaque member for permitting light from the inside of said tube to pass through said tube and illuminate said photocells;

opaque means, fixedly supported and extending longitudinally in said transparent tube, for permitting light emanating from said light source to directly illuminate one of said photocells and for preventing light emanating from said light source to directly illuminate the other of said photocells but permitting refracted light to illuminate the other of said photocells;

piston means, mounted for reciprocal longitudinal movement in said tube, for drawing fluid into and expelling fluid from said tube through said open end and moving the fluid into and out of the plane containing said light source and said photocells, said piston having means defining a cavity therein for the reception of a portion of said opaque means whereby said piston means can move along said opaque means.

* * * * *